UNITED STATES PATENT OFFICE.

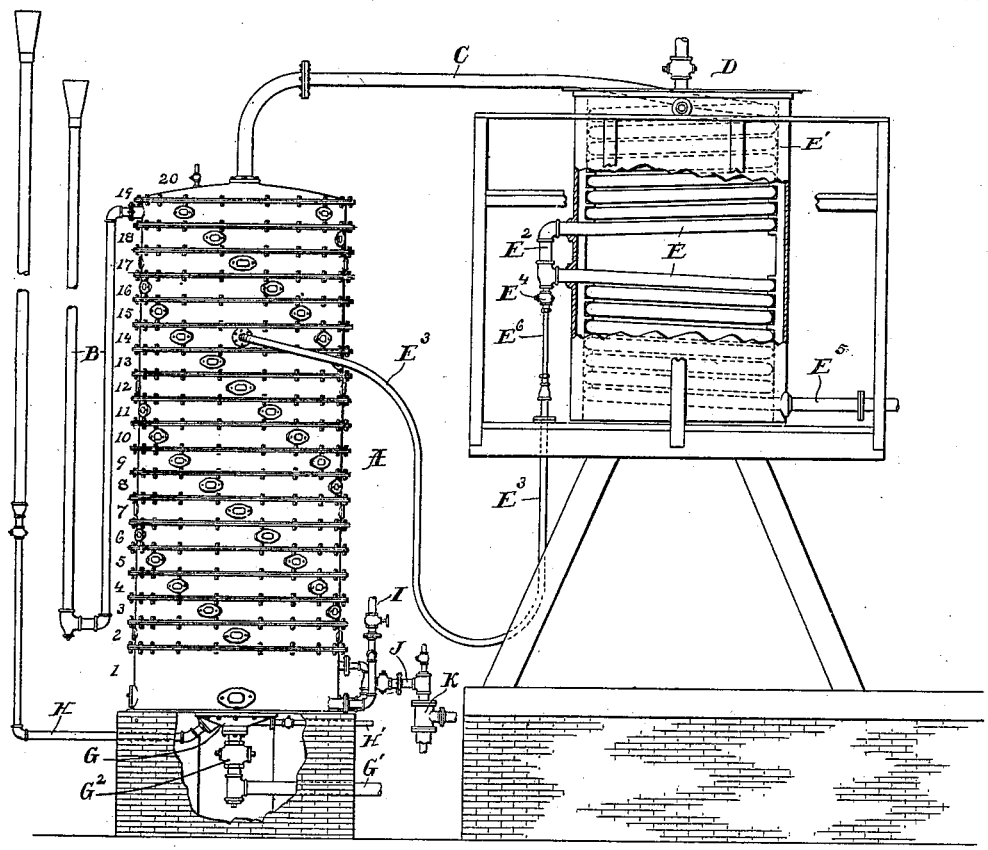

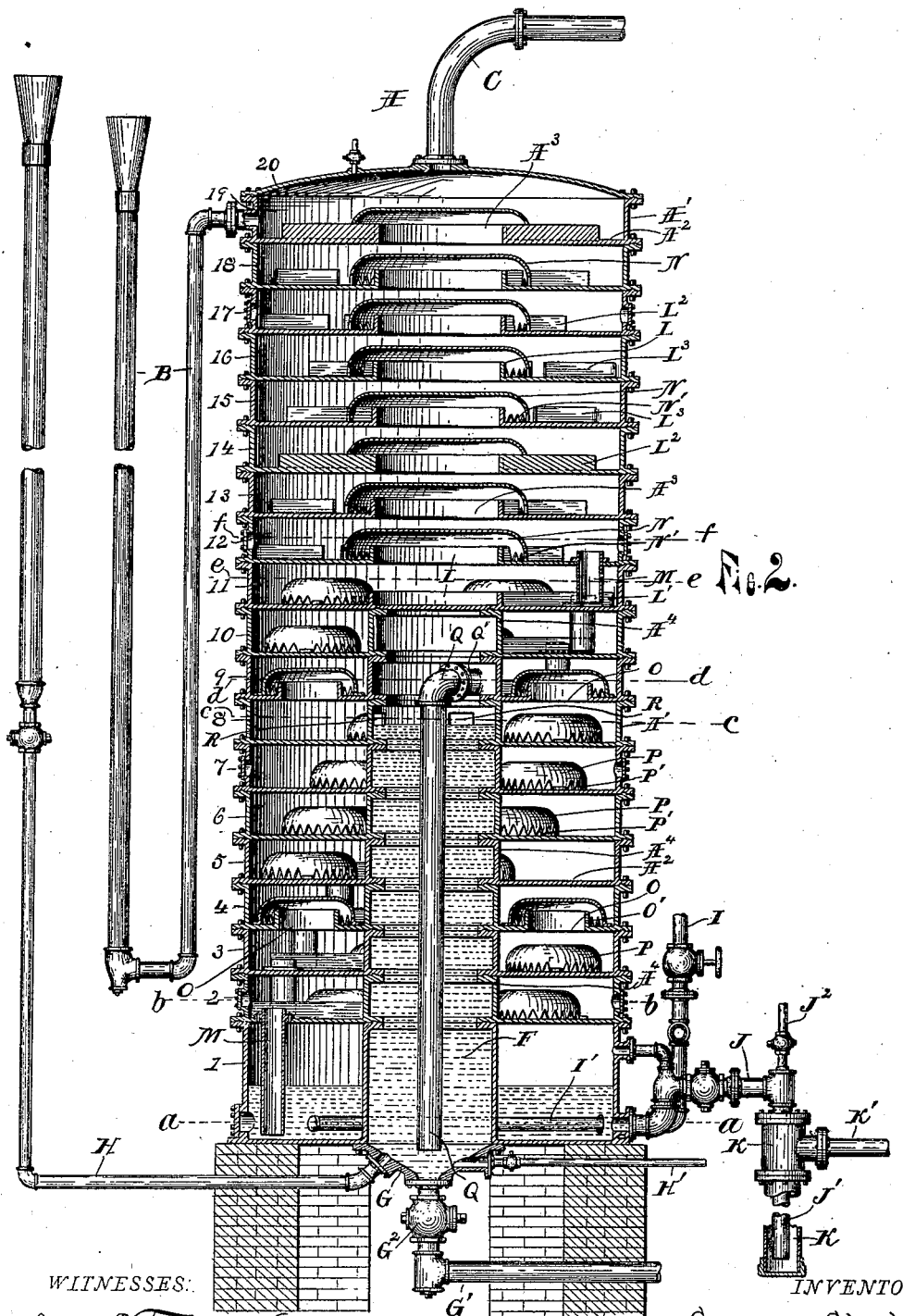

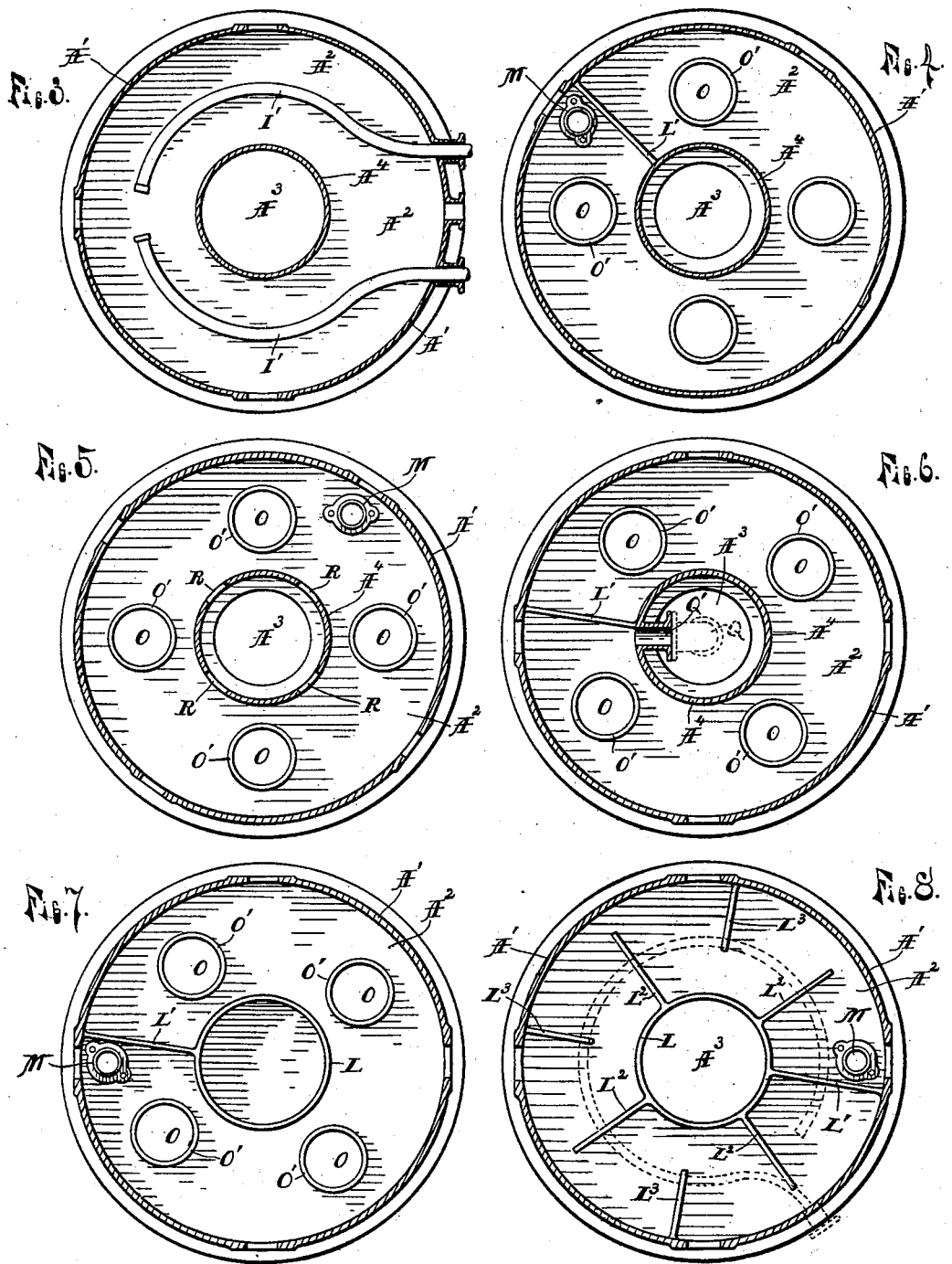

GEORGE STROH, OF DETROIT, MICHIGAN, ASSIGNOR OF ONE-HALF TO GEORGE OSIUS, OF DETROIT, MICHIGAN.

AMMONIA-STILL.

SPECIFICATION forming part of Letters Patent No. 710,221, dated September 30, 1902.

Application filed February 24, 1902. Serial No. 95,158. (No model.)

*To all whom it may concern:*

Be it known that I, GEORGE STROH, a citizen of the United States of America, residing at Detroit, in the county of Wayne and State of Michigan, have invented certain new and useful Improvements in Ammonia-Stills, of which the following is a specification, reference being had therein to the accompanying drawings.

The object of my invention is to carry out in a single still-column and by a single operation a continuous process for the treatment of ammoniacal liquors, consisting of first depriving the crude liquor of its volatile constituents, then mixing the residue with milk of lime for the decomposition of the carbonate of ammonia and treating this admixture to recover the remaining ammonia; and a further object of this invention is to produce dehydrated ammonia by providing a condenser from which the first products of condensation may be returned to the still-column, whereby the column is cooled by the returned liquor, and thus a stronger ammoniacal vapor produced.

To this end my invention consists in providing a still-column having an upper portion for the treatment of the crude liquor to free its volatile constituents and a lower portion provided with a liming-chamber into which the residue of liquor from the portion of the column above is conducted and from which chamber the mixture of liquor and milk of lime overflows into the lower portion of the column.

It also consists in connecting a condenser with the top of said column and providing a return-pipe having a controlling-valve to conduct the first products of condensation back into the still-column, near the lower end of the upper portion thereof; and it further consists in the particular arrangement, construction, and combination of parts, all as hereinafter more fully described, and particularly pointed out in the claims, reference being had to the accompanying drawings, in which—

Figure 1 is a side elevation of a still embodying my invention, showing the still-column and condenser with portions broken away to show the construction. Fig. 2 is a central vertical section of the still-column on an enlarged scale. Fig. 3 is a transverse section on the line $a\ a$ of Fig. 2; Fig. 4, the same on the line $b\ b$; Fig. 5, the same on the line $c\ c$; Fig. 6, the same on the line $d\ d$; Fig. 7, the same on the line $e\ e$, and Fig. 8 the same on the line $f\ f$.

A is a still-column consisting of a series of superimposed circular rectifying pans or sections provided with outwardly-projecting flanges which are so formed and bolted together as to form gas and water tight joints between the pans. For the purpose of identifying the different pans they are numbered in the drawings from 1 to 19, inclusive, beginning at the bottom of the column. The upper pan 19 is provided with an outwardly-projecting integral flanged coupling, to which is secured the supply-pipe B, through which ammoniacal liquor is supplied, said pipe extending downward to near the bottom of the column, as shown, to form a water seal. Bolted to the top of pan 19 is the convex head 20, from the axis of which head leads the pipe C to conduct the ammoniacal vapors to the condenser D, which condenser consists of a coil of pipe E, said coil being divided intermediate its ends and provided with a gravity-return connection $E^2$, which is connected by a pipe $E^3$ with the pan 14 of the column to return the condensation in the upper half of the coil to the still-column. A regulating-valve $E^4$ is placed in the return-pipe $E^3$, so that all or only a part of the first products of condensation, which are the less volatile constituents of the vapor, may be returned to the still to be again volatilized, and thus the strength of the liquid issuing from the discharge-pipe $E^5$ of the coil may be regulated and a commercial article obtained without any further treatment. As the still-column is heated at its base, the lower pans would be liable to become overheated and too much aqueous vapor produced were it not for the returning of this cool condensation to the column at a point some distance from its top, and thus the dilution of the liquor in the condenser by the production and passing over of too much aqueous vapor is prevented. The pipe $E^3$ is extended downward to form a seal to prevent the flow of the vapor therethrough, and a sight-tube $E^6$ placed in this pipe aids the operator in determining the proper degree of opening for the valve $E^4$.

In this device the crude liquor enters the upper pan of the column in a continuous stream, and as it passes down the column from pan to pan its temperature is gradually raised to free the volatile ammonia, and when the liquor has reached a point in its downward course in the still-column where all such volatile constituents have passed off the residue, containing principally sulfate of ammonia, is conducted into a decomposing-chamber containing milk of lime, from which chamber it again overflows into the pans, where its temperature is still further raised as it passes down the remaining half of the column. Thus by the time the liquor reaches the bottom pan all of the ammonia originally contained therein has passed off in the form of an aqueous gas or vapor, and the residue is discharged from the lower pan in a continuous stream.

Each of the pans is provided in its outer wall $A'$ with manholes and in the bottom $A^2$ of each pan, except in pan 11, is an axial opening $A^3$. In each of the pans 1 to 10, inclusive, adjacent to said opening $A^3$ is a vertical annular wall $A^4$, extending upward the same distance as the outer wall $A'$ and flanged inward to engage the flange of the pan above to form a tight joint. The securing of these pans one upon the other thus forms a well F in the axis of the lower portion of the column, which well is closed at the bottom by securing to the bottom of pan 1 or base of the column the conical casting G, to the apex or lowest point of which casting is connected the blow-off pipe $G'$, said pipe being provided with a shut-off valve $G^2$. Opening through one side of the casting G is the supply-pipe H, through which milk of lime is supplied to the well, and a small steam-pipe $H'$ opens through the opposite side of said casting to supply a jet of steam for agitating the liquid in said well.

I is a large steam-pipe provided with a T at its lower end to span the discharge-pipe, each branch of which T is extended through the side of the base-pan 1 and provided with a curved pipe $I'$, which extends across the pan, closed at its inner end and provided with perforations along its side for the escape of the steam.

J is the discharge-pipe, which is branched to connect with the pan 1 near the top and bottom thereof and extended vertically downward at its outer end, as at $J'$, into a pipe K of larger diameter, which is closed at its ends and filled with water to form a water seal for the end $J'$ of the discharge-pipe, an overflow-pipe $K'$ being connected to the top of the water-seal pipe K to conduct the waste liquor to the sewer. The steam-pipe I supplies steam to the column under pressure and maintains a certain pressure in the column, which would force the waste liquor in the pan 1 out through the discharge-pipe if its outer end were not sealed. The column of water in the seal K is of such a height that the steam-pressure on the liquor in the pipe $J'$ is not great enough to raise that column of water and force it out through the overflow-pipe, and therefore the waste liquor is prevented from being blown off; but as it rises in the pan and flows into the pipe $J'$ the liquor in the pipe K will be raised and overflows through the pipe $K'$ in a steady stream, the steam-pressure having no effect on its flow because of the seal. A blow-off pipe $J^2$ extends vertically upward from the outer end of the pipe J, through which the steam in the column may be blown off. The discharge-pipe J being connected to the pan 1 near its top and bottom by the branch pipes thereof, which meet and join said pipe near the transverse center line of the pan, maintains the liquor in this outer annular chamber of said pan on a level with said pipe, or about one-half full, and thus the steam-pipes $I'$ are at all times covered by the liquor, which is heated to the boiling-point by the steam which is discharged into it. The upper portion of the column in which the process of volatilizing the free ammonia is carried on consists of the pans 12 to 19, inclusive, all of like construction except that the pans 14 and 19 are provided with integral flanged couplings, to which the pipes B and $E^3$ are connected. Extending upward from the edge of the axial opening $A^3$ in each of these pans is the flange or wall L, which is preferably made approximately one-half the height of the outer wall $A'$ or depth of the pan, and extending radially outward from this wall L in each pan is the division-wall $L'$, which connects with the outer wall $A'$, and the four walls $L^2$ also extend radially outward from the wall L, but do not so connect with the outer wall, as they are stopped off to leave a passage between their outer ends and the outer wall. Intermediately between the walls $L^2$ and extending inwardly from the outer wall $A'$ are the walls $L^3$ of the same height as the walls $L^2$ and are stopped off to leave a passage between their inner ends and wall L. The crude liquor enters the pan 19 at one side of the division-wall $L'$ and passing the ends of the walls $L^2$ and $L^3$ flows in a tortuous path around the pan to the overflow-pipe M, located at the opposite side of said wall, which pipe extends above the bottom $A^2$ a distance slightly less than the height of the wall L and downward through the bottom to near the bottom of the next pan below, so that the liquor rising in the upper pan will overflow through said pipe M into the lower pan before reaching such a height as to overflow into the opening $A^3$. As the liquor rises in the pan below the lower end of the said pipe M will be sealed thereby, each of the pans next below throughout the entire column being turned a short distance relative to the one above to bring the overflow-pipe of the said pan above on the opposite side of division-wall $L'$ to that on which the overflow of the lower pan of the two is located.

The column being continually cooled by the cold liquor coming in at the top and heated entirely by the steam injected at the bottom, the temperature of each succeeding pan is greater than that of the one above, and thus as the liquid flows down the column its temperature is gradually raised to free the volatile gases, which gases pass up through the opening $A^3$ in each of the pans 12 to 19, inclusive, a cap N provided with notches $N'$ in its lower edge being secured over said opening to force the ascending gases to dip down into the liquor of the pan above, said notches being submerged, as they are of lesser depth than the height to which the overflow-pipe extends above the bottom $A^2$.

As before described, the pans from 1 to 10, inclusive, are provided with inner walls $A^4$, which form a well F in the axis of the column and an annular chamber in each pan between said inner and outer walls, and the upper end of this well is closed by the pan 11, (shown in Fig. 7,) its bottom being continuous and cutting off the passage for the gases formed by the openings $A^3$ in the pans above, so that it is necessary to provide other passages for the gases through this and the pans below. For this purpose four circular openings O are provided in the bottom of the outer annular chamber of each of the pans of the lower portion of the column, and extending upward from the edges of these openings are the flanges or walls $O'$, corresponding in height to that of the walls L and $L'$, which are also provided in these lower pans. Over these openings O are secured the caps P, having notches $P'$ and of similar construction and for the same purpose as the caps N. Each of the pans below this pan 11 is provided with like openings O, caps P, a division-wall $L'$, and an overflow-pipe M, except pan 9, (shown in Fig. 6,) which has no overflow-pipe, and pan 8, (shown in Fig. 5,) which has no division-wall.

By the time the ammoniacal liquor has reached pan 11 in its downward course it has been freed of its volatile gases, and in order to recover the remaining ammonia from the sulfate of ammonia contained therein it is necessary to treat the residue with milk of lime. As described, the decomposing or liming chamber F is supplied with milk of lime through the pipe H, and the liquor which has passed from pan 11 through pan 10 into pan 9 by way of the overflow-pipes M escapes from said pan 9 through the flanged coupling $Q'$, which projects into the well from the wall $A^4$ into the pipe Q, which pipe extends downward in the axis of the column to near the bottom of said well to conduct the liquor thereto. In the wall $A^4$ of pan 8 are openings R, through which the mixed liquor and milk of lime overflows into said pan, where it covers the bottom and again overflows through the pipe M into the pan below, and so on until it reaches pan 1, the extreme heat and aqueous vapors having in the meantime carried off all ammonia contained in the liquors, which gaseous vapors have passed upward through the openings O and in passing the caps P have been each time washed by the liquor contained in that chamber. By thus causing the aqueous vapors to repeatedly pass through the liquor and at the same time gradually cooling them dehydrated ammoniacal vapor is secured at the top of the column, and by then condensing this vapor and returning a portion of the condensation to the column, as described, anhydrated ammonia is produced. The liquor returned from the condenser is comparatively strong in free ammonia, and by returning this liquor to the column at a point some distance from its top the gases from this liquor will be repeatedly washed before again reaching the top of the column and will therefore be freed from aqueous vapors.

Each pan is provided with manholes to facilitate the cleaning of the same; but it has been found that in actual practice but very little sediment or incrustation accumulates, because of the constant agitation of the liquid in every part of the column. The division-walls $L'$ make it necessary for liquor to flow around the pan, and the passing of the gases through the liquor also constantly agitates it. The liquor in the lower pan is kept constantly boiling by the steam, and the sediment passes off through the discharge-pipe, and the steam-pipe $H'$, connected with the bottom of the wall, constantly agitates the milk of lime therein; but if any sediment does collect in the well it will gather in the conical bottom and may be easily blown off through the pipe $G'$. The radial walls $L^2$ and $L^3$ in the upper pans cause the liquor to flow as it passes around the pan alternately toward the center and circumference of the pan, and thus it is alternately cooled and heated as it comes in contact with the cool outside wall or the heated inner wall.

Having thus fully described my invention, what I claim is—

1. In a still-column, the combination with an upper series of superimposed pans for the volatilization of the free ammonia contained in the crude liquors; of a lower series of superimposed pans provided with inner and outer walls forming an outer chamber in each pan and a well extending upward from the bottom of the column, said well being closed at its top by the lower pan of the upper series and provided with openings in its sides for the overflow of the liquor therein into said outer chambers, a pipe to conduct the residue of liquor from the pans of the upper series into said well, a pipe to supply milk of lime to said well and means for heating said column.

2. In a still-column, the combination with the upper portion thereof adapted to receive the crude liquors and volatilize the free ammonia therein contained; of a lower portion provided with a central vertical well having overflow-openings near its top, a conical casting to close the bottom of said well, a blow-off pipe connected to said casting, a pipe extending downward within the well to conduct the residue of the liquor from the portion of the column above to the bottom of the well, a supply-pipe connected to the bottom of the well to supply milk of lime thereto, and a steam-pipe to supply a jet of steam for agitating the liquor within said well.

3. In combination with a still-column having an inner vertical wall within its lower portion dividing the same into an inner liming chamber or well and an outer volatilizing-chamber, a base having an inner chamber forming the lower end of said well and an outer chamber to receive the spent liquor from the column above, a steam-pipe within said outer chamber to supply steam thereto and maintain a pressure therein, a discharge-pipe provided with branches which are connected to said outer chamber, one near its top and the other near its bottom, a water seal into which the discharge-pipe extends, and an overflow-pipe connected to the top of said water seal.

4. In a still-column, in combination, an upper series of superimposed pans each having a central opening to form a passage for the ascending gases, a lower series of superimposed pans each provided with a central opening surrounded by a wall to engage the pan above and form a vertical well, and a pan having a bottom to close the upper end of the well and provided with openings in its bottom outside of the well for the passage of the gases from the lower to the upper series of pans.

5. In a still-column, a series of superimposed pans each provided with an outer wall, a bottom and a central opening in said bottom having an upwardly-extending flange or wall, a wall in each pan extending outward from said flange to the outer wall, a pipe to supply liquor to the pan located at one side of said outwardly-extending wall and an overflow-pipe at the opposite side of the same, walls extending radially outward from said flange to near the outer wall, and walls located intermediately of the radial walls and extending inward from the outer wall to near the said flange.

6. In a still-column, the combination with an upper series of superimposed pans to the upper pan of which series the crude liquor is supplied and from which the gaseous vapors are drawn off, said pans being provided with central openings for the passage of the ascending gases, overflow-pipes for the descending liquor, and means for causing the liquor in each pan to be alternately cooled and heated; of a lower series of superimposed pans each having a central opening surrounded by a wall to form a well within the axis of the lower series of pans, said pans being also provided with openings for the passage of the ascending gases and overflow-pipes for the downward passage of the liquor, a pan having a bottom to close the upper end of said well and also provided with openings for the passage of the gases and an overflow-pipe, a pan having openings for the passage of the gases and also a nozzle extending into the well from its inner wall for the escape of the liquor into said well, a pan provided with openings in its inner wall through which the liquor in said well overflows into said pan, said pan being also provided with openings for the passage of the gases and an overflow-pipe for the escape of the liquor into the series of pans, a steam-pipe in the lower pan of the lower series, a discharge-pipe leading from said lower pan, and means for maintaining the liquor at a certain height in the lower pan.

In testimony whereof I affix my signature in presence of two witnesses.

GEORGE STROH.

Witnesses:
OTTO F. BARTHEL,
LEWIS E. FLANDERS.